3,467,499
NITROGEN DETERMINATION CATALYST AND METHOD OF USE
Joseph E. Woodbridge, Wynnewood, Pa., assignor, by mesne assignments, to American Hospital Supply Corporation, Evanston, Ill., a corporation of Illinois
No Drawing. Filed Jan. 24, 1967, Ser. No. 616,747
Int. Cl. G01n *31/10, 31/00*
U.S. Cl. 23—230                                              17 Claims

ABSTRACT OF THE DISCLOSURE

A phenate-hypochlorite reaction for determining the presence of ammonia nitrogen in fluids in which a combination of potassium ferrocyanide and a mercuric compound is utilized as catalyst.

BACKGROUND

In 1859 Berthelot reported on a color reaction which occurs when ammonia, sodium phenate, and sodium hypochlorite are intermixed (Repertorie d Chimie Appliquee 11: 284, 1859) but the procedure was not used extensively until Lubochinsky and Zolta described the use of sodium nitroprusside as a catalyst to increase the speed, yield, and reproducibility of the color reaction. Since then, other workers have further developed the use of nitroprusside as a catalyst in the colorimetric determination of urea in biological fluids (Fawcett and Scott, J. Clin. Path. 13: 156, 1960, and Chaney Patent 3,119,751).

While it appears that potassium ferrocyanide has also been considered as a possible catalyst in the phenate-hypochlorite reaction, efforts to use such a catalyst have been generally unsuccessful and have been abandoned, presumably because such a catalyst is relatively ineffective and is incapable of producing the color development which arises from the use of a nitroprosside catalyst.

SUMMARY

The invention resides in part in the discovery that the effectiveness of potassium ferrocyanide as a catalytic agent in a phenate-hypochlorite reaction is increased many times over by simply including in the system small amounts of water-soluble mercuric compounds. Any of a variety of mercuric compounds may be used as, for example, mercuric chloride, mercuric nitrate, and phenyl mercuric acetate.

The use of such a catalytic combination results in an improved method for determining the presence of nitrogen in biological fluids. Except for the differences in the catalytic system, the procedure and reagents are similar to those disclosed by Berthelot (Repertorie d Chimie Appliquee 11: 284, 1959, Ternberg and Hershey (J. Lab. and Clin. Med. 56: 766, 1960), and Fawcett and Scott (J. Clin. Path 13: 156, 1969). The materials which are employed in such a procedure, other than the catalysts, comprises muffered urease, a phenol reagent, and a hypochlorite reagent. It is to be understood that the use of urease is necessary only where the procedure is to be used for the determination of urea; where the nitrogen is not contained in urea but is already available in a solution of ammonia, then the use of urease is unnecessary.

DESCRIPTION

As indicated above, the materials for performing a phenate-hypochlorite reaction, apart from the catalysts, comprise buffered urease, a phenol reagent, and a hypochlorite reagent. Urease in relatively high levels of purity is commercially available. A buffered solution of the enzyme may be prepared by dissolving 200 mg. disodium ethylenediamine tetraacetate and 30 mg. urease with 20 ml. of ammonia-free distilled water. Other buffers such as monopotassium dihydrogen phosphate and disodium monohydrogen phosphate may also be used.

The phenol reagent comprises a mixture of phenol and potassium ferrocyanide, the phenol preferably dissolved in a minor proportion )10 to 20 percent by weight of the total) of ammonia-free water. The result is a viscous aqueous solution of phenol containing a small amount of potassium ferrocyanide in crystalline form. At the time of use of the reagent, the phenol solution is diluted with additional amounts of ammonia-free water and such dilution causes the ferrocyanide crystals to dissolve. In its final concentration, the reagent comprises a solution of phenol in the concentration range of 1.0 to 1.2 percent, preferably about 1.1 percent, and contains approximately .004 to .04 gram potassium ferrocyanide for each 100 ml. of solution. It has been found that the phenol reagent in its final dilution is particularly effective where it contains approximately 0.01 gram potassium ferrocyanide for each 100 ml. of solution.

The alkali metal hypochlorite reagent preferably contains lithium hypochlorite along with trace amounts of water-soluble mercuric salts such as, for example, phenyl mercuric acetate, phenyl mercuric borate, phenyl mercuric nitrate, mercuric nitrate, or mercuric chloride. While all of such mercuric salts are effective, in combustion with the potassium ferrocyanide, in catalyzing the colorimetric reaction, phenyl mercuric acetate is particularly suitable where serum is to be tested because, as an organic mercuric compound, it is less likely to interfere or react undesirably with the serum proteins. Phenyl mercuric borate and phenyl mercuric nitrate have also been found effective in connection with the testing of serum and, like phenyl mercuric acetate, do not exhibit any protein interference with the serum.

The lithium hypochlorite reagent may be supplied and stored in solid form and then dissolved in ammonia-free water at the time of use.

The final hypochlorite solution should contain between 0.05 to 0.10 gram of lithium hypochlorite for each 100 ml. of solution, with 0.07 gram per 100 ml. being considered the optimum amount. The final solution should also contain an excess of alkali cations which may be provided by any suitable alkali metal salt such as, for example, sodium hydroxide. Where sodium hydroxide is used, the ratio by weight of sodium hydroxide to lithium hypochlorite may be within the range of 5:1 to 10:1, the preferred range being approximately 7:1. The preferred ratio is achieved by dissolving 0.07 gram of lithium hypochlorite and 0.5 gram of sodium hydroxide in 100 ml. of ammonia-free water.

Any of a number of water-soluble mercuric salts may be used as a co-catalyst as long as such a salt is not capable of being precipitated by any of the reactants and is present in sufficient concentration to catalyze the reaction in the presence of serum. Phenyl mercuric acetate, phenyl mercuric borate, mercuric nitrate, and phenyl mercuric nitrate have all been found effective. The mercuric salt should be present in the lithium hypochlorite solution in the ratio of approximately 0.01 to 0.05 gram for each 100 ml. of solution. A concentration of 0.03 gram per 100 ml. of solution has been found particularly effective.

It is believed apparent from the above that each of the two testing reagents contains one of the two essential co-catalysts, the potassium ferrocyanide being present in the phenol reagent and the mercuric salt being present in the lithium hypochlorite reagent. The final testing solution is obtained by simply mixing together equal volumes of the two reagents. It is important, however, that the final solution, containing both catalytic agents, be used within three to five minutes following mixing. The mixed solutions are simply added to test tubes containing small amounts of the materials to be tested, the tubes are then incubated for three to five minutes at 100 degrees C., and the optical densities of the samples are measured against distilled water at 630 mu. in any suitable photometer or spectrophotometer.

The practice of the invention is further illustrated by referring to the following examples:

Example 1

A buffered urease reagent may be prepared by transferring 0.3 gram of urease having an activity of 220 Summer units per gram as measured at 20 degrees C. to a 50 ml. Erlenmeyer flask which contains 0.5 gram of Amberlite MB–1 resin, and adding thereto, with stirring, approximately 25 ml. of ammonia-free water. The supernatant is decanted into a 250 ml. beaker, the residue is washed with two 10 ml. portions of ammonia-free water, decanting the washings into the beaker, and 1.0 grams of ethylenediamine tetraacetic acid (EDTA) is added to the beaker. Additional ammonia-free water is added to the beaker to bring the total volume to 100 ml., the reagent is stirred until all of the EDTA is dissolved, and the solution is then filtered through a Whatman No. 5 filter.

The phenol color reagent may be prepared by dissolving 5.5 ml. of an 85 percent aqueous phenol solution, and 0.05 gram of potassium ferrocyanide, in 500 ml. of ammonia-free water.

The hypochlorite reagent is prepared by mixing 2.5 grams of sodium hydroxide, 0.35 gram lithium hypochlorite, and 0.15 gram of phenyl mercuric acetate, in 500 ml. of ammonia-free water. The reagent should be stirred until all of the ingredients are fully dissolved.

All three reagents are placed in separate bottles, and the bottles are capped and stored under refrigeration at 2 to 10 degrees C. until use.

The test procedure is carried out by pipetting 0.2 ml. of buffered urease reagent into each of the series of 12×125 ml. test tubes. To each tube is then added 0.02 ml. of either serum or of various standards, using a hemoglobin pipette. The standards are prepared by dissolving measured amounts of an analytical grade aqueous ammonia sulfate solution in water to obtain various known ammonia nitrogen concentrations, the undiluted standard solution containing 0.5 mg. nitrogen for each milliliter of solution.

All of the tubes containing the buffered urease reagent and the serum or standards are incubated at 37 degrees C. for 15 minutes. Thereafter, 5.0 ml. of phenol color reagent and 5.0 ml. of alkaline hypochlorite reagent are pipetted into each tube, and the contents are immediately mixed by inversion against a polyethylene film. Within three to five minutes, all of the tubes must be incubated in a boiling water bath for five minutes. Thereafter, the tubes are cooled to room temperature, and the optical densities of all samples are measured against distilled water at 630 millimicrons using a Leitz 640 mu filter and a Beckman spectrophotometer.

Calibration was obtained by preparing four standard solutions containing 30, 20, 10, and 0 mg. of nitrogen for each 100 ml. by diluting measured amounts of the standard ammonia sulfate solution with measured amounts of water. Thereafter, each standard sample was treated as set forth above and the optical density of such samples were plotted (along with the optical densities of the serum samples) against known concentration on linear graph paper. The maximum deviation of measured nitrogen values and known nitrogen values for the standard samples was 7 percent.

Example 2

The procedure outlined in Example 1 was repeated with a lithium hypochlorite reagent prepared by using 0.15 gram of mercuric nitrate instead of phenyl mercuric acetate. After subtracting the value for the blank, the measured amount of nitrogen in the standard specimens correspond with the known percentages of nitrogen of such standards within a maximum deviation of 7 percent.

Example 3

The procedure of Example 1 was carried out using 0.15 gram of phenyl mercuric nitrate in one instance, and 0.15 gram phenyl mercuric borate in a second instance, in place of the phenyl mercuric acetate of the hypochlorite reagent. The percentage of transmission for a known sample containing 20 mg. of nitrogen in 100 ml. of solution was 46.0 percent. The same test conducted with an alkali metal hypochlorite reagent containing phenyl mercuric nitrate as a catalyst yielded a transmission percentage of 48.3 percent, and the same test conducted using phenyl mercuric borate as the catalyst yielded a transmission percentage of 45.9 percent.

From the foregoing, it is believed apparent that the blue-colored indophenol compound formed when ammonia nitrogen solution is reacted with phenol and alkaline hypochlorite at 100 degrees C. in the presence of potassium ferrocyanide and a mercuric salt is proportional to the ammonia content of the sample. The catalytic system is highly specific and gives rise to a fast (three minute) reaction which quantitatively indicates the amount of ammonia nitrogen in any given specimen of biological fluid.

The effectiveness of the test depends on the presence of both catalytic agents; the presence of either the potassium ferrocyanide or the mercuric salt, without the other, fails to result in any appreciable color development. While this invention consists in part in the recognition that the two catalytic agents, when present together, produce a highly effective catalytic system in a Berthelot reaction, and the precise reasons for their effectiveness when present together in the same reaction mixture are not fully understood.

While in the foregoing, I have disclosed the invention in considerable detail for purposes of illustration, it will be understood by those skilled in the art that many of these details may be varied without departing from the spirit and scope of the invention.

I claim:

1. A catalyst for use in a method for determining the presence of ammonia nitrogen in a sample of fluid treated with an aqueous testing solution of phenol and an alkali metal hypochlorite, comprising a combination of potassium ferrocyanide and a water-soluble mercuric salt in said testing solution, said potassium ferrocyanide being of a concentration within the range of 0.004 to 0.04 gram, and said mercuric salt being of a concentration within the range of 0.01 to 0.05 gram, for each 200 ml. of testing solution.

2. The catalyst of claim 1 in which said mercuric salt is an organic mercuric salt.

3. The catalyst of claim 1 in which said mercuric salt is phenyl mercuric acetate.

4. The catalyst of claim 1 in which said mercuric salt is phenyl mercuric borate.

5. The catalyst of claim 1 in which said mercuric salt is phenyl mercuric nitrate.

6. The catalyst of claim 1 in which said mercuric salt is mercuric nitrate.

7. The catalyst of claim 1 in which said mercuric salt is mercuric chloride.

8. In a reagent combination for testing the presence of ammonia nitrogen in fluids which includes a first aqueous solution of phenol and a second aqueous solution of an alkali metal hypochlorite, a two-component catalytic system comprising potassium ferrocyanide and a water soluble mercuric salt, one of said components of said catalytic system being dissolved in said aqueous phenol solution and the other being dissolved in said alkali metal hypochlorite solution.

9. The reagent combination of claim 8 in which said alkali metal hypochlorite is lithium hypochlorite.

10. The reagent combination of claim 8 in which the concentration of mercuric salt in one of said solutions is within the range of 0.01 to 0.05 gram for 100 ml. of solution, and the concentration of potassium ferrocyanide in the other of said solutions is within the range of 0.004 to 0.04 gram per 100 ml. of solution.

11. The reagent combination of claim 10 in which said mercuric salt is an organic mercuric salt.

12. The reagent combination of claim 10 in which said mercuric salt is phenyl mercuric acetate.

13. The reagent combination of claim 10 in which said mercuric salt is phenyl mercuric borate.

14. The reagent combination of claim 10 in which said mercuric salt is phenyl mercuric nitrate.

15. The reagent combination of claim 10 in which said mercuric salt is mercuric nitrate.

16. The reagent combination of claim 10 in which said mercuric salt is mercuric chloride.

17. In a method for colorimetrically and quantitatively determining the amount of ammonia nitrogen in a sample by reacting the nitrogen of such sample with phenol and an alkali metal hypochlorite in the presence of a catalyst, the step of catalyzing such reaction with potassium ferrocyanide and a water-soluble mercuric salt in aqueous solution, said potassium ferrocyanide being present in a concentration range of 0.004 to 0.04 gram for each 200 ml. of phenol hypochlorite solution, and the concentration of said mercuric salt being within the range of 0.01 to 0.05 gram for each 200 ml. of phenol hypochlorite solution.

References Cited
UNITED STATES PATENTS

| | | | |
|---|---|---|---|
| 3,119,751 | 1/1964 | Chaney | 195—103.5 |
| 3,409,508 | 11/1968 | Hughes | 195—127 |

MORRIS O. WOLK, Primary Examiner

SIDNEY MARANTZ, Assistant Examiner

U.S. Cl. X.R.

195—99, 103.5; 252—408